Aug. 31, 1926. 1,598,432
J. P. FOX
CONTROLLING MECHANISM FOR POWER DRIVEN VEHICLE LIGHTS
Filed Feb. 23, 1921 2 Sheets-Sheet 2
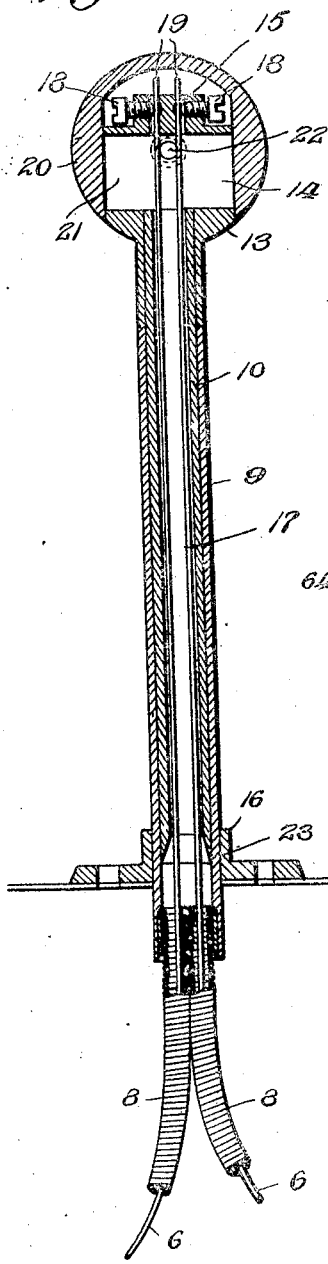
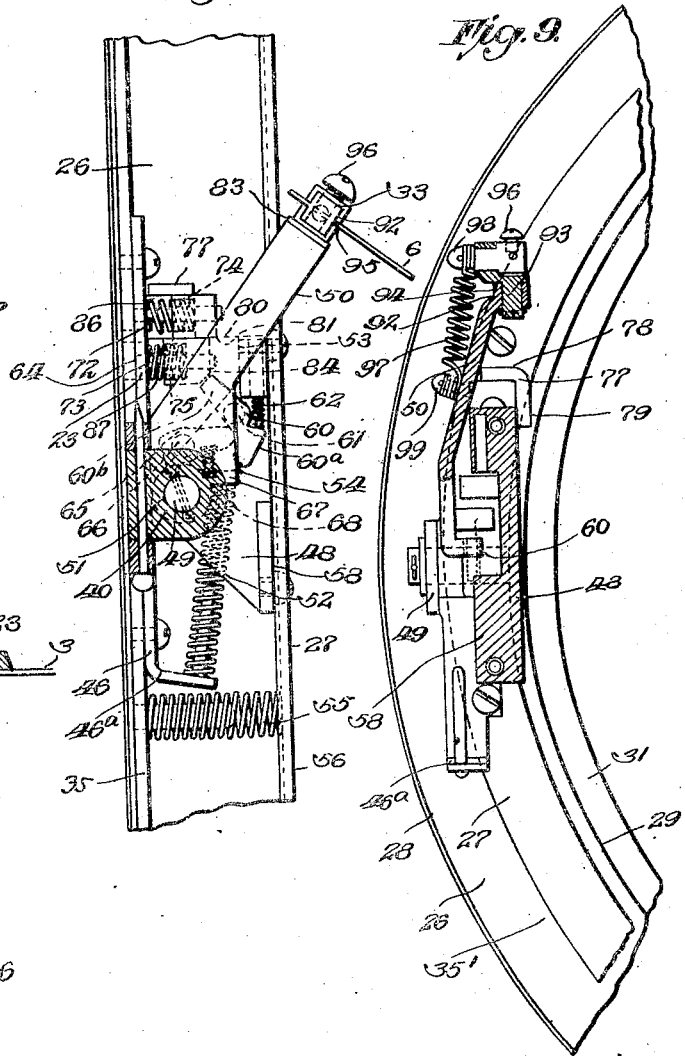
Inventor.
Joseph P. Fox
By Thomas A. Jenkins Jr.
Attorney Patented Aug. 31, 1926.

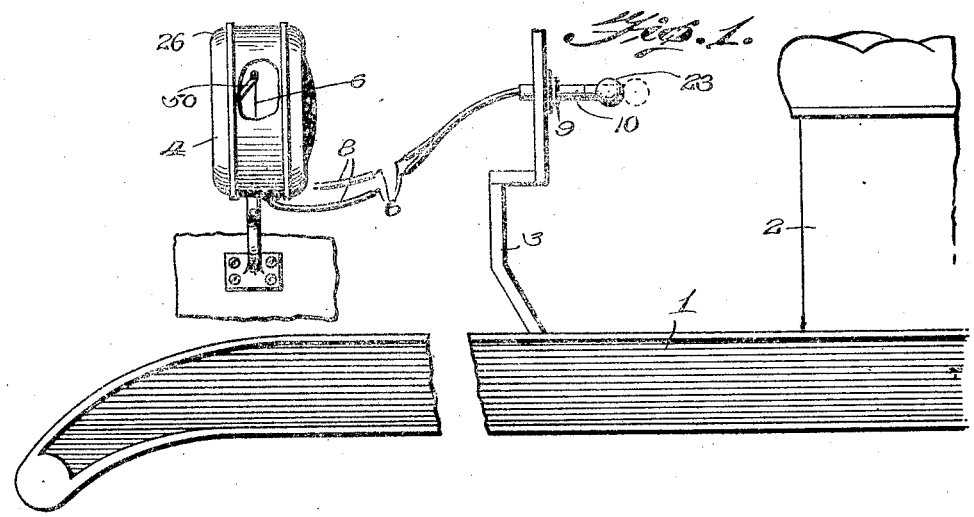
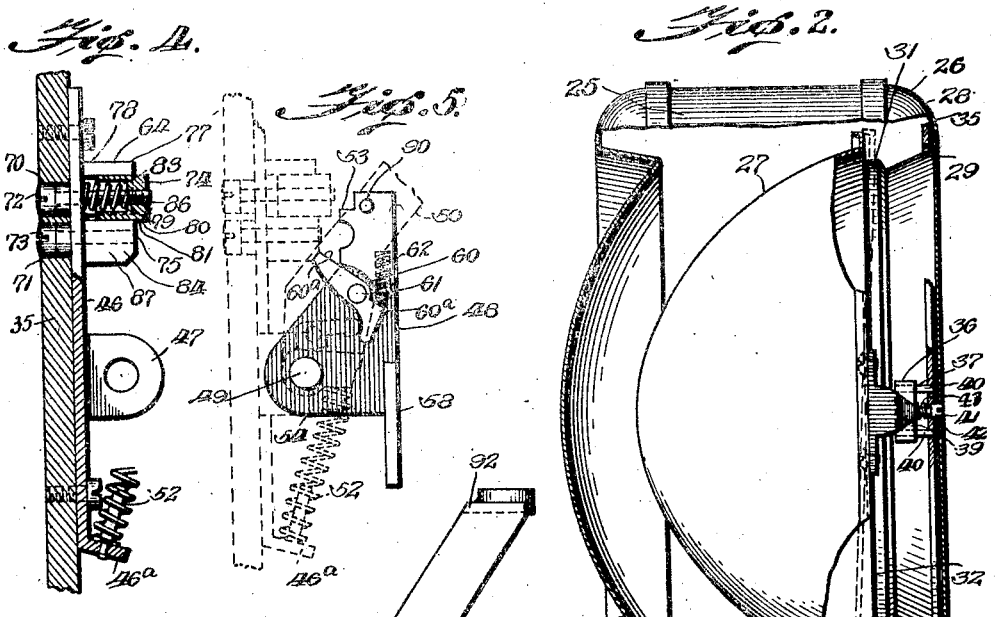
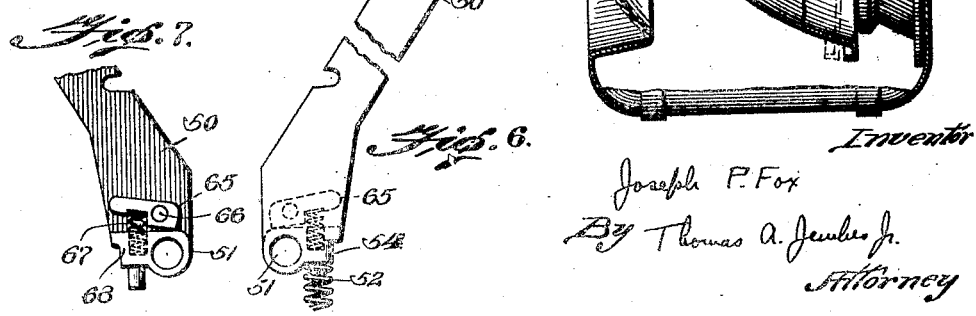

1,598,432

UNITED STATES PATENT OFFICE.

JOSEPH P. FOX, OF WEST BARRINGTON, RHODE ISLAND.

CONTROLLING MECHANISM FOR POWER-DRIVEN-VEHICLE LIGHTS.

Application filed February 23, 1921. Serial No. 447,364.

My invention relates to controlling mechanism for power driven vehicles of various kinds such as automobiles, electric or steam cars, boats, etc., and particularly to controlling mechanism for dirigible lights on such vehicles.

The object of this invention is to create controlling mechanism most conveniently near the steering wheel and within easy reach of the operator's seat, comprising a minimum number of driving members for a maximum number of results as well as disclosing means and ways to manufacture the invention in a standardized form easily adaptable and quick detachable to all vehicles without changing the design of the vehicle or the attachment and with a minimum of labor and expense for results accomplished.

In some respects this invention is an improvement on my invention for dirigible lights covered by United States Patent No. 1,038,739, dated September 17th, 1912.

The invention has principally for its object the arrangement and control of dirigible lights for vehicles in which it is intended to secure the greatest possible light when desired and to create means to reduce the glare of such lights instantly from the driver's seat, while still retaining the necessary volume of light for safe traveling.

The invention is such that by means of a pull ball or a foot lever within convenient reach of the driver's seat both search lights or head lights may be tilted or moved laterally to the desired angle or centered at will.

The great value of the invention is its novel assembly, supplying a working mechanism which although loose in all bearings still delivers the most accurate results, eliminating all rattle by spring means, furnishing automatic take-up of bearings by spring means, eliminating all oiling by loose bearings and spring driving means, supplying novel outside adjustments for centers and tilts and for vertical and lateral setting of reflector, obtaining a standardized assembly for all lamps.

The invention as disclosed herewith has the much desired novel feature of efficient and economical combinations combining economy in manufacture and quick assembly.

These and such other objects of my invention as may hereinafter appear will be best understood from a description of one embodiment thereof, such as is illustrated in the accompanying drawings.

Referring to the accompanying drawings forming a part of this specification in which similar characters of reference indicate corresponding parts in all the views and in which, Fig. 1 is a diagrammatic side elevation illustrating the means accessible from the driver's seat for actuating the tilting mechanism.

Fig. 2 is a side elevation of a lamp, partially broken away to illustrate how one side of the reflector is pivotally mounted on the lamp rim.

Fig. 3 is a longitudinal sectional view of the pull ball means for actuating the tilting mechanism.

Fig. 4 is a side elevation partially shown in section of the tilting mechanism base.

Fig. 5 is a side elevation partially shown in section of the pivoted reflector support, and co-operating cam pivoted thereon, the tilting mechanism base being shown in dotted lines.

Fig. 6 is a side elevation of the pivoted lever.

Fig. 7 is a side elevation of part of the opposite side of the pivoted lever, showing the cam-shaped wedge and co-operating spring pivotally mounted thereon.

Fig. 8 is a sectional side view of the tilting mechanism.

Fig. 9 is a plan view of the tilting mechanism, partially shown in section.

In the drawings, wherein like characters of reference indicate like parts throughout, 1 generally indicates the frame of an automobile, having mounted therein the usual driver's seat 2 and dash board 3. Lamps 4 are suitably mounted on the body of the automobile in front of the hood.

I will first describe the pull ball means for actuating the tilting mechanism. Wires 6 are attached to the pivoted levers 50 of the tilting mechanism of each lamp 4, and are led through flexible tubes 8 to the dash board 3. A stationary tube 9 is attached to any stationary part of the automobile, preferably the dash board 3 within easy reach of the driver's seat 2. Another tube 10 of smaller diameter is slidably enclosed within said stationary tube 9. Said tube 10 is enlarged at its protruding end 13 to provide means for attaching the end of the wires 6 thereto. A portion of said enlarged end 13 comprises a chamber-like compartment 14, and the other portion thereof is provided with longitudinal guide holes 15. The wires 6 are inserted through the tube 9, suitably mounted in the plug 16 in said dash board 3, and are led through longitudinal bores 17 in the slidable tube 10, through the longitudinal guide holes 15 in the enlarged end 13 thereof, into which they are locked by the screws 18, the protruding ends 19 of the wires being bent over into the chamber-like compartment 14. A ball cover 20 is internally chambered as at 21, to slidably encompass the enlarged end 13 of the slidable tube 10, and to be locked into position thereon by the screw 22. The ends of the flexible tubes 8 are securely threaded into the front end of the tube 9 which is mounted as explained on the plug 16. It is obvious that to adjust the end of the wire 6 it is only necessary to remove the ball cover 20, loosen the screw 18, and adjust the length thereof.

As stated, the lamps 4 are suitably mounted on the body of the automobile. The lamps 4 comprise the cover 25 with the front rim 26 suitably attached thereto. I provide a novel means for pivoting a reflector 27 thereon, so that the mounting mechanism thereof will not be visible from the front of the lamp, and so that the tiltable reflector 27 may have a tilting movement between the outer edge 28 of the front rim 26 and the inner edge 29 thereof. To permit this movement the inner edge 29 of said lamp rim 26 is gradually beveled, to a lens holding rim 31 of smaller diameter, on which is suitably mounted the lens 32. It is thus apparent that the means for mounting the reflector hereinafter described, is completely hidden from view, and the reflector 27 is permitted a large tilting radial movement between the outer edge 28 of the grooved front rim 26 and the inner gradually beveled edge 29 thereof.

The reflector 27 is pivotally mounted on means attached to ring 35 within the annular groove 35' of said front rim 26. Said means comprises a tilting mechanism on one side thereof, and a support 36 pivotally mounted on a base member 37 attached to said annular ring 35 within said front rim 26. The reflector 27 is thus tiltably mounted in one plane on said front rim 26. It is desirable to provide means whereby the reflector may be adjusted and centered in all planes. The means adapted to do so and to co-operate with the tilting mechanism on one side of the reflector will be described later. To center the reflector in the plane perpendicular to the functioning of the tilting plane, I loosely attach the reflector 27 to the tilting mechanism, and provide on the opposite side thereof the novel centering means only accessible from without the lamp. The base member 37 is slidably mounted on pins 40 projecting inwardly from the annular ring 35 within the front rim 26. The front surface of the front edge of the rim 26 is provided with a hole 41, adapted to tightly receive a screw 42 threaded into the base 39 of the base member 37. The coil spring 43 encircles said screw 42 and registers against the base 39 of the base member 37 and the surface of the annular ring 35 within the front rim 26. It is thus apparent that turning the screw 42 in one direction will further thread the screw into the base member 37, thus drawing the reflector 27 towards the front rim 26. On turning the screw 42 in the other direction, and thus unthreading it, it is apparent that the spring 43 will force automatically the reflector 27 away from the front rim 26.

The tilting mechanism before mentioned will now be described. As stated, the tilting mechanism is designed to co-operate with pivoting means on the opposite side of the lamp. The tilting mechanism is preferably actuated by means accessible from the driver's seat in a manner to be described. A base member 46 is suitably mounted within the annular groove 35' of said front rim 26. Said base member 46 has the lugs 47 raised upwardly therefrom to serve as bearings. A reflector supporting bracket 48, has extending laterally from one side thereof the shaft 49 for pivotal mounting thereof on the lugs 47. A lever 50 has a sleeve 51 projecting laterally from one side thereof, for pivotal mounting thereof on the lugs 47 exterior of the shaft 49 of the reflector supporting bracket 48. Said lever 50 is thus free to move on the base member 46 independently of the reflector supporting bracket 48. A spring 52 contacting a lug 46ª on the base member 46 bears against the lower end 54 of the lever 50 to keep the lever 50 in lowered position. The reflector supporting bracket 48 has depending from the upper side thereof the lug 53 for a purpose to be described. A spring 55 is mounted between the side flange 56 of the reflector 27, and the annular ring 35 within the front rim 26 to tilt the reflector supporting bracket 48 in one direction. The reflector supporting bracket 48 has a lug 58 projecting laterally from one side thereof adapted to contact the upper edge of the lever 50, thus tilting the supporting bracket 48 in the opposite direction on raising of the lever 50. A cam 60 is pivotally mounted on a shaft 61 projecting laterally from said supporting bracket 48. A spring 62 functioning between said supporting bracket 48 on the upper end 60ª of said cam 60 tends to pivot said cam 60 into a position where the lower end 60ᵇ thereof will bear against means 64 adjustable on the outside of the lamp in a manner to be described, to automatically retain said support 48 in the desired normal position of the reflector. The upper end 60ª of the cam 60 is bent over for a purpose to be described. A cam shaped wedge 65 is pivotally upwardly mounted on a shaft 66 projecting laterally from one side of the lever 50. Said wedge 65 is held in upward position by a spring 67 bearing against one side thereof and mounted against a sidewise projecting lug 68 on said lever 50.

I provide means to adjustably center the reflector both in normal and tilted position accessible from without the lamp as follows: Said means are generally similar to the means already described for centering a reflector in a plane perpendicular to the tilting plane. Adjacent holes 70 and 71 are provided in the annular ring 35 within the front rim 26. Screws 72 and 73 are suitably tightly mounted from without within said holes. Contacting blocks 74 and 75, are suitably threaded to receive the ends of the screws 72 and 73. A flange 77 is struck up from the base member 46 having edges 78 and 79 at right angles to each other to contact the side of the block 74 to prevent pivotal movement thereof. The side 80 of the block 74 contacting the side 81 of the block 75 prevents pivotal movement of the block 75. Said blocks 75 and 76 are respectively internally chambered as at 83 and 84 from the base thereof to receive within them the coil springs 86 and 87 contacting the ends of said chambers 83 and 84 and the annular groove 35' of the front rim 26. It is thus apparent that the blocks 74 and 75 are adjustable inwardly and outwardly by turning of the screws 72 and 73, turning the screws 72 and 73 in one direction drawing the blocks outwardly and turning the screws 72 and 73 in the opposite direction permitting the springs 86 and 87 to force the blocks inwardly. The aforedescribed lug 53 depending from the reflector supporting bracket 48 is adapted to contact the adjustable block 74 when the tilting mechanism is in tilted position. When the tilted mechanism is in normal position, as explained, the lower end 60ª of the cam 60 bears against the adjustable block 75, thus providing for centering adjustment from without when the reflector is in normal position.

The operation of the tilting mechanism is obvious from the above description. When the tilting mechanism is in normal position, the spring 52 keeps the pivoted lever 50 in lowered position, said lever 50 registering against a pin 90 projecting laterally from the reflector supporting bracket 48. The spring 62 functioning against the upper end 60ª of the cam 60 keeps the lower end 60ᵇ of the cam 60 in contact with the adjustable block 75. It is obvious that slight raising of the lever 50 will cause the upwardly projecting wedge 65 to contact the bent over upper end 60ª of the cam 60 to pivotally swing said cam 60 out of engagement with the block 75. The spring 55 will then function to tilt the reflector supporting bracket 48, until the lug 53 depending from the lower side thereof contacts the adjustable block 74 and limits its downward movement. Further raising of the lever 50 will cause the upper edge thereof to contact the lug 58 projecting laterally from the reflector supporting bracket 48, thus tilting up the supporting bracket 48 against the pressure of the spring 55 (Fig. 8). When the supporting bracket 48 has reached normal position, the spring 62 functioning against the upper end of the cam 60 pivots the cam 60 so that the lower end 60ᵇ thereof may contact the adjustable block 74, thus locking the reflector supporting bracket 48 in normal position. It is obvious that further raising of the lever 50 will operate to further tilt the reflector supporting bracket 48 beyond normal.

I connect the upper end 92 of the lever 50, to the pull ball actuating means as follows: The upper end 92 thereof is provided with a downwardly projecting bore for revolvably mounting therein the shaft 93 of the universal joint 94, (Fig. 9). The wire 6 is fastened within a bore 95 in the universal joint by means of the screw 96. The loose revolvable universal joint 94 is held in position on the upper end 92 of the lever 50 by the spring 97, one end thereof being attached to the sidewise projecting lug 98 on the universal joint, and the other end thereof being attached to a pin 99 mounted on the lever 50. It is obvious, therefore, that the wire is free to move universally around the upper end 92 of the lever 50. A slight pull on the slidable pull ball 20 acting through the wire 6 operates to slightly raise the lever 50. This will be sufficient to cause the wedge 65 to trip the cam 60 to permit the spring 55 to force the reflector supporting bracket 48 into tilted position as explained. A further pull on the slidable pull ball will operate to further lift up the lever 50 which contacting the lug 58 on the reflector supporting bracket 48 will raise it up, until the spring 62 functioning against the upper end 60ª of the cam 60 will cause the lower end 60ᵇ thereof to contact the adjustable block 75 to lock the reflector supporting bracket 48 in normal position. Further pulling on the pull ball means will operate to further raise up the reflector supporting bracket 48 beyond normal, thus permitting if used for this purpose, raising of the reflectors to lighten the road for the driver when ascending a hill.

It is obvious that I am not only providing novel means invisible from without to permit a large tilting radial movement of a pivotally mounted reflector within an annular groove on the front rim, improved means for centering a reflector in any plane accessible from without, and a tilting mechanism for vehicle reflectors provided with an automatic locking system, operated practically entirely by spring means and mounted in loose bearings which can be cheaply and roughly machined, the use of spring means and loose bearings eliminating any possibility of rattle on the wear thereof, and the need for oil which tends to befog the reflectors and lenses, which may be operated by a simple pull ball attachment actuated from the driver's seat.

It is understood the invention is not limited to the specific embodiment shown and that various deviations may be made therefrom without departing from the spirit and scope of the appended claims.

What I claim as new and desire to secure as Letters Patent is:

1. In a vehicle lamp having a front rim and a reflector pivotally mounted therein, means accessible from the outside of the lamp for centering said reflector, comprising a screw threaded through the front rim of the lamp, means threaded on the threaded end of said screw adapted to contact said reflector and operative on turning of the screw to move the reflector in one direction, and a coil spring surrounding said screw and bearing against said threaded means and said front rim operative on the loosening of said screw to move said threaded means to move said reflector in the opposite direction.

2. In a vehicle lamp having a reflector pivotally mounted therein, a tilting mechanism for said reflector located at one of the pivot points thereof, comprising a reflector support pivotally mounted within said lamp, means pivotally mounted within said lamp independently of said support for letting said support in one direction, spring means to tilt said support in the opposite direction, means for automatically locking the support in normal position, and means to co-operate with said tilting means to release said locking means.

3. In a vehicle lamp, the combination of a reflector pivotally mounted within said lamp, a tilting mechanism for said reflector located at one of the pivot points thereof comprising a reflector support pivotally mounted within said lamp, means pivotally mounted within said lamp independently of said support for tilting said support in one direction, spring means to tilt said support in the opposite direction, means for automatically locking the support in normal position, means to co-operate with said tilting means to release said locking means, and means operative from the driver's seat to actuate said tilting mechanism.

4. In a vehicle lamp having a front cover and a reflector pivotally mounted therein, a tilting mechanism for said reflector located at one of the pivot points thereof, comprising a base member mounted on said cover, a reflector support pivotally mounted on said base member, means mounted on said base member independently of said support to tilt said support in one direction, spring means to tilt said support in the opposite direction, means to automatically lock said support in normal position, and means to cooperate with said tilting means to release said locking means.

5. In a vehicle lamp having a front cover, the combination of a reflector pivotally mounted within said lamp, a tilting mechanism for said reflector located at one of the pivot points thereof, comprising a base member mounted on said cover, a reflector support pivotally mounted on said base member, means mounted on said base member independently of said support to tilt said support in one direction, spring means to tilt said support in the opposite direction, means to autotmatically lock said support in normal position, means to co-operate with said tilting means to release said locking means, and means operative from the driver's seat to actuate said tilting mechanism.

6. In a vehicle lamp having a front cover, and a reflector pivotally mounted therein, a tilting mechanism for said reflector located at one of the pivot points thereof, comprising a base member mounted on said front cover, a reflector support pivotally mounted thereon, a lever mounted on said base member independently of said support to tilt said support in one direction, spring means to tilt said support in the opposite direction, a spring actuated cam pivotally mounted on said support to contact said cover to automatically lock said support in normal position, and a spring actuated wedge pivotally mounted on said lever adapted to function on partial raising of said lever to take said cam out of engagement with said cover.

7. In a vehicle lamp having a front cover and a reflector pivotally mounted therein, a tilting mechanism for said reflector located at one of the pivot points thereof comprising a base member mounted on the front rim thereof, a reflector support pivotally mounted thereon, having a lug adapted to contact adjustable means on said cover to center said reflector in tilted position, a lever mounted on said base independently of said support and provided with means to raise it to tilt said reflector in one direction, spring means to resist the raising of said lever, spring means to tilt said support in the opposite direction, a spring actuated cam pivotally mounted on said support to contact adjustable centering means for normal position on said cover to automatically lock said support in normal position, and a spring actuated wedge pivotally mounted on said lever adapted to function on partial raising of said lever to take said cam out of engagement with said means on said cover.

8. In an automobile, the combination of the headlights, each having a reflector pivotally mounted therein, tilting mechanisms for said reflectors and means operative from the driver's seat to actuate said tilting mechanisms comprising universal joints attached to the operative ends of said tilting mechanisms, wires attached to said universal joints, flexible tubes to guide the wires from within said lamps to within a single tube, said tube having a chamber therein provided with holes in the wall thereof for adjustably holding the ends of said wires, screws for locking said wires therein and a ball cover for said chamber, said tube being slidable within a stationary tube mounted within reach of the driver's seat.

In testimony whereof, I have signed my name to this specification.

JOSEPH P. FOX.